(12) United States Patent
Gutierrez Gaspar et al.

(10) Patent No.: US 10,118,562 B2
(45) Date of Patent: Nov. 6, 2018

(54) AUTOMATIC SLIDING ROOF RAIL SYSTEM

(71) Applicant: FORD GLOBAL TECHNOLOGIES, LLC, Dearborn, MI (US)

(72) Inventors: Jose Humberto Gutierrez Gaspar, Naucalpan de Juarez (MX); Jesus Alejandro Pena Casimiro, Naucalpan (MX); Juan Pablo Rios Rendon, Mexico City (MX); Gabriel Yaokoatl Horta Hernandez, Cuautitlan (MX); Norberto Mondragon Hernandez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/202,036

(22) Filed: Jul. 5, 2016

(65) Prior Publication Data
US 2018/0009389 A1    Jan. 11, 2018

(51) Int. Cl.
*B60R 9/045* (2006.01)
*B62D 25/04* (2006.01)
*B62D 25/06* (2006.01)

(52) U.S. Cl.
CPC .............. *B60R 9/045* (2013.01); *B62D 25/04* (2013.01); *B62D 25/06* (2013.01)

(58) Field of Classification Search
CPC .......... B60R 9/045; B62D 25/06; B62D 25/04
See application file for complete search history.

(56) References Cited

U.S. PATENT DOCUMENTS

| 6,029,873 | A | 2/2000 | Won et al. |
| 2003/0141735 | A1 | 7/2003 | Albaisa et al. |
| 2004/0195866 | A1 | 10/2004 | Fin |
| 2008/0272624 | A1* | 11/2008 | Donicke ................ B60R 9/045 |
| | | | 296/216.01 |
| 2012/0074187 | A1 | 3/2012 | Gobart |
| 2012/0125961 | A1 | 5/2012 | Gobart |

FOREIGN PATENT DOCUMENTS

EP          1533186 A2    5/2005

OTHER PUBLICATIONS

English Machine Translation of EP1533186A2.

\* cited by examiner

*Primary Examiner* — D Glenn Dayoan
*Assistant Examiner* — Melissa A Black
(74) *Attorney, Agent, or Firm* — Jason Rogers; King & Schickli, PLLC

(57) ABSTRACT

A system for providing storage on a vehicle roof is provided. The system comprises at least one partially hollow pillar for supporting the vehicle roof, a rail adapted to being raised and lowered relative to the vehicle roof between a deployed position for receiving cargo and a non-deployed position. An actuator is positioned at least partially along or within the at least one pillar for moving the rail relative to the roof. The actuator may comprise a pinion and a rack providing support for the rail. One or more supports may be connected to the rail for sliding as the rail is raised and lowered, including an active support for raising and lowering the rail in response to actuation. One or more passive supports for the rail may be slidably received in different pillars from the active support.

20 Claims, 6 Drawing Sheets

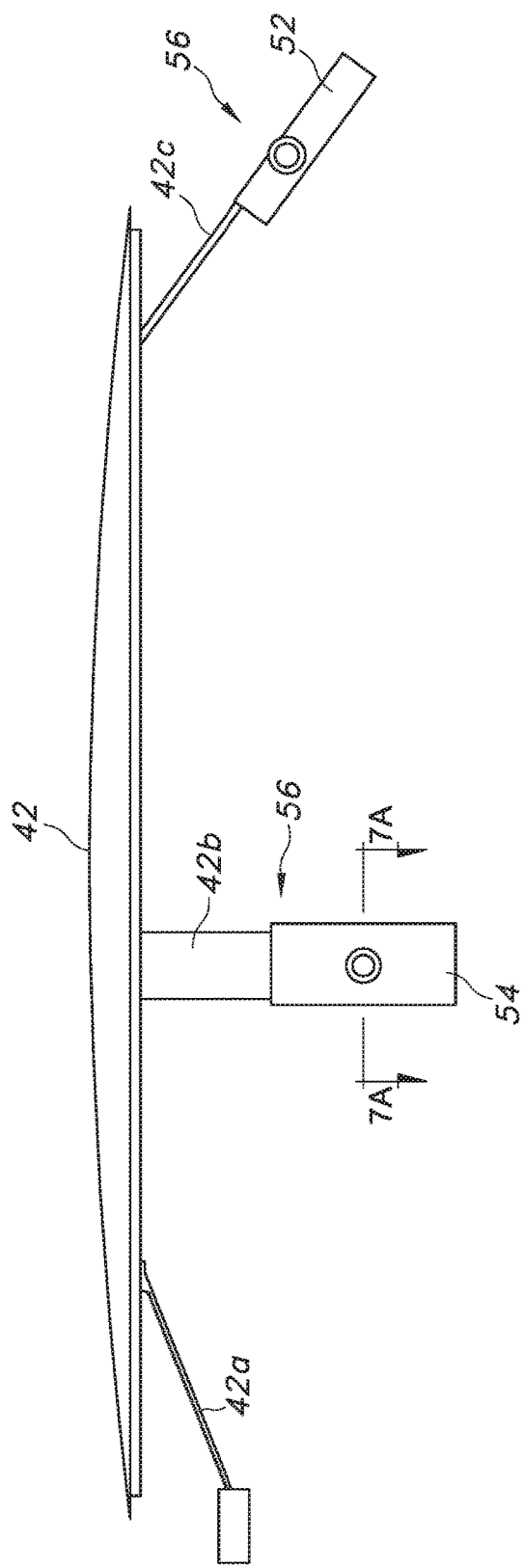
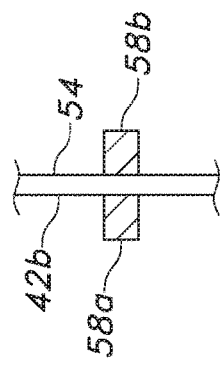
FIG. 7
FIG. 7A

AUTOMATIC SLIDING ROOF RAIL SYSTEM

TECHNICAL FIELD

This document relates generally to the motor vehicle field and, more particularly, to an automatic sliding roof rail system.

BACKGROUND

Roof rail systems are often provided on motor vehicles to provide a convenient place for storing oversized or excess cargo that cannot be accommodated in other vehicle storage areas, such as the cabin or trunk. The roof rail is typically a fixed structure secured directly to the roof. This may create an obstruction in terms of the wind, which can lead to increased noise and reduced fuel efficiency, and may also have an undesirable impact on the aesthetics of the vehicle.

Accordingly, a need is identified for an improved automatic roof rail system that addresses the foregoing issues and perhaps others not yet contemplated.

SUMMARY

According to one aspect of the disclosure, a system for providing storage on a vehicle roof. The system includes at least one partially hollow pillar for supporting the vehicle roof. A rail is provided for raising and lowering relative to the vehicle roof between a deployed position and a non-deployed position. An actuator is positioned at least partially along or within the at least one pillar for moving the rail relative to the roof.

In one embodiment, the actuator comprises a support for the rail positioned at least partially within the at least one pillar. The at least one pillar may comprise an A-pillar. A second rail may also be provided for being raised and lowered relative to the vehicle roof, along with a second actuator for moving the second rail.

A first support may be slidably connected to the rail. The first support may be positioned in a C-pillar. A second support for the rail may be positioned in a B-pillar, and may be fixed to the rail between the support forming part of the actuator and the support positioned in the C-pillar.

The actuator may comprise a pinion and the rail may be connected to a rack in engagement with the pinion and positioned at least partially within the at least one pillar. A latch may also be provided for latching the rail in a raised position. The latch may comprise a magnetic coupling formed between a support for supporting the rail and another pillar for supporting the vehicle roof.

According to a further aspect of the disclosure, a system for providing storage on a vehicle roof is provided. The system comprises at least one pillar for supporting the vehicle roof, and a rail adapted to being raised and lowered relative to the roof. A support for the rail is received within the at least one pillar.

An actuator may also be provided for moving the rail relative to the roof. The actuator may be positioned at least partially within the at least one pillar. The system may also be arranged to work in connection with a plurality of pillars, with support for the rail associated with each of the plurality of pillars. The support may also be slidably connected to the rail.

Still a further aspect of the disclosure pertains to a system for providing storage for cargo. The system comprises a vehicle including a roof, and a rail adapted to being raised and lowered relative to the roof. A support for supporting the rail is connected to the rail for sliding as the rail is raised and lowered.

An actuator may also be connected to the support for moving the rail. A second support may be provided for supporting the rail for sliding as the rail is raised and lowered. Likewise, a third support may be provided, and may be fixed to the rail between the first and second supports. The roof may be supported by at least one pillar and at least partially received therein.

In the following description, several embodiments of an automatic sliding roof rail system. As it should be realized, the arrangement is capable of other, different embodiments and its several details are capable of modification in various, obvious aspects all without departing from the system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed automatic sliding roof rail system serve to explain certain principles thereof. In the drawing figures:

FIG. 7 illustrates the system with latches for holding the rail in the raised or deployed position; and FIG. 7A is a cross-sectional view along line 7A-7A of FIG. 7.

Reference will now be made in detail to the present preferred embodiments of the automatic sliding roof rail system, examples of which are illustrated in the accompanying drawing figures.

DETAILED DESCRIPTION

Figure 1:
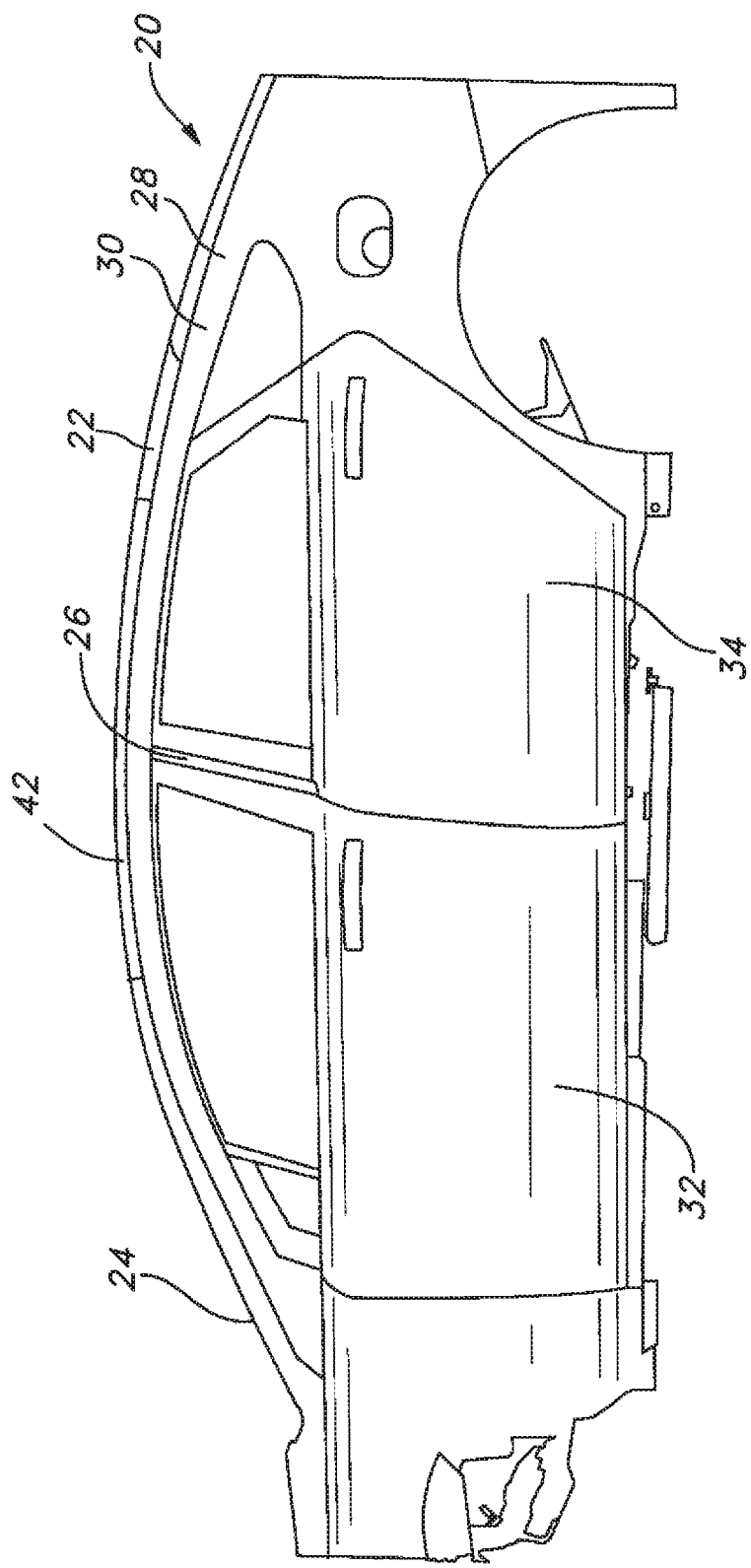
FIG. 1 is a side view illustrating a vehicle including a plurality of pillars for supporting the roof.

Reference is now made to FIG. 1, which illustrates a vehicle 20 including a front or "A" pillar 24 for supporting and interfacing with adjacent structures, such as a windshield, a vehicle roof comprising a panel 22, and doors 32, 34 (which may also include windows). The vehicle 20 may also include a vertical or "B" pillar 26, as well as a rear of "C" pillar 28. Each pillar 24, 26, 28 may form portions of the vehicle body 30. The pillars 24, 26, 28 may be generally hollow, tubular structures that extend generally upwardly in a vertical direction relative to the direction of vehicle travel, and connect with the panel 22 to provide support for it. The B-pillar 26 is the most vertical and is positioned between the doors 32, 34, while the A-pillar 24 and C-pillar 28 extend in a sloped manner toward the front and rear of the vehicle 20, respectively.

The vehicle 20 may be provided with a selectively actuatable roof rail system 40. In the illustrated embodiment, the system 40 includes a pair of spaced rails 42, 44 adapted for moving between a lowered or non-deployed position (FIG. 1) closer to the roof panel 22 and a raised or deployed position (FIG. 2) spaced from the roof panel. As can be appreciated, the rails 42, 44 in the non-deployed position create a lower profile for the vehicle 20, and in the raised position may accommodate articles for storage on the roof panel 22 while the vehicle is traveling.

According to one aspect of the disclosure, the system 10 includes an actuator 46 that may be associated with one of the pillars 24, 26, 28, such as by being positioned along or within it. In the illustrated embodiment, the actuator 46 is positioned at least partially within a recess or cavity in the front or A-pillar 24, and includes an active support 42a for supporting the rail while moving it to and fro between the lowered/non-deployed and raised/deployed positions. The support 42a is at least partially received in a recess of the A-pillar. Actuation of the actuator 46 thus moves the support 42a and causes the rail 42 to move relative to the roof panel 22.

Figure 2:
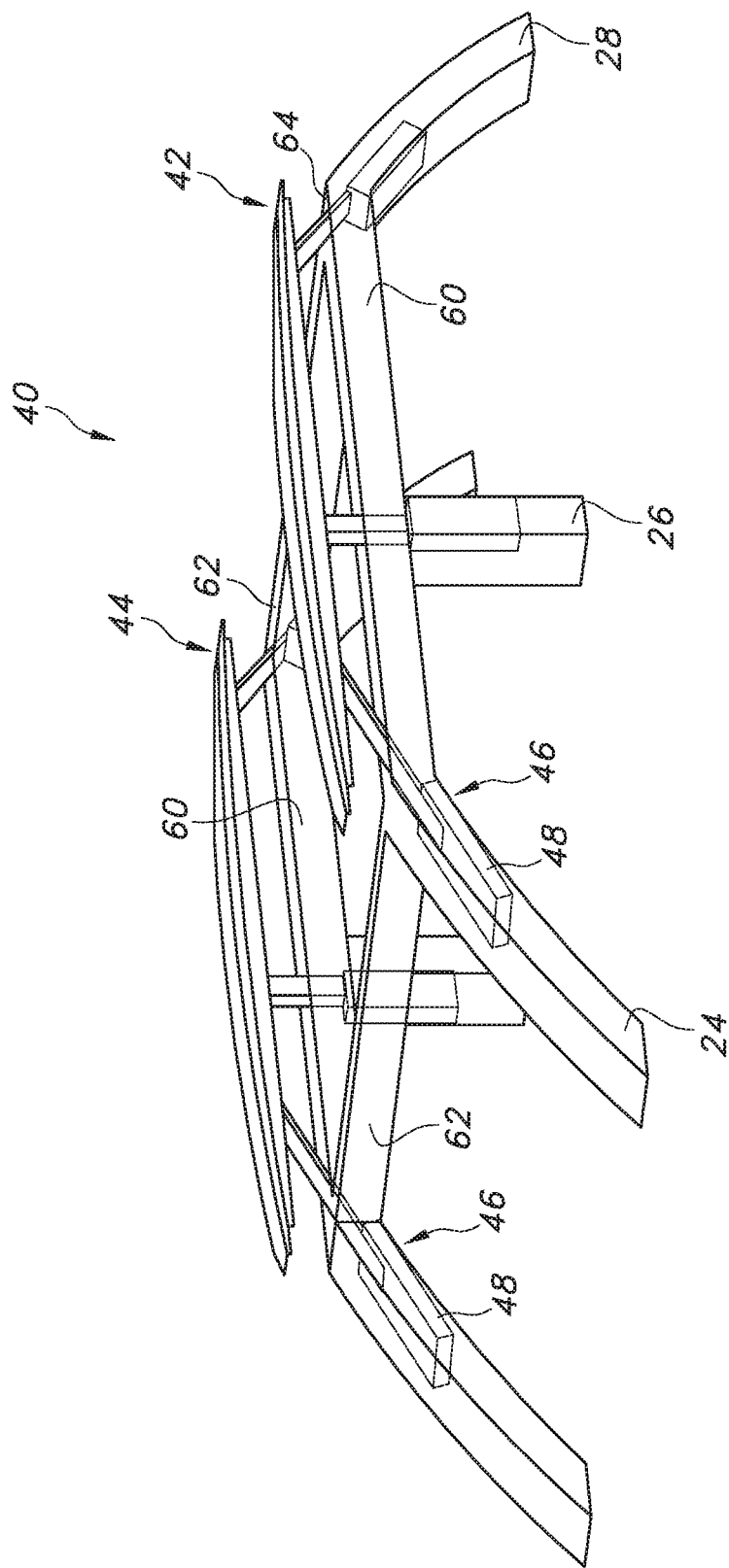
FIG. 2 is a perspective view of an automatic sliding roof rail system.
Figure 3:
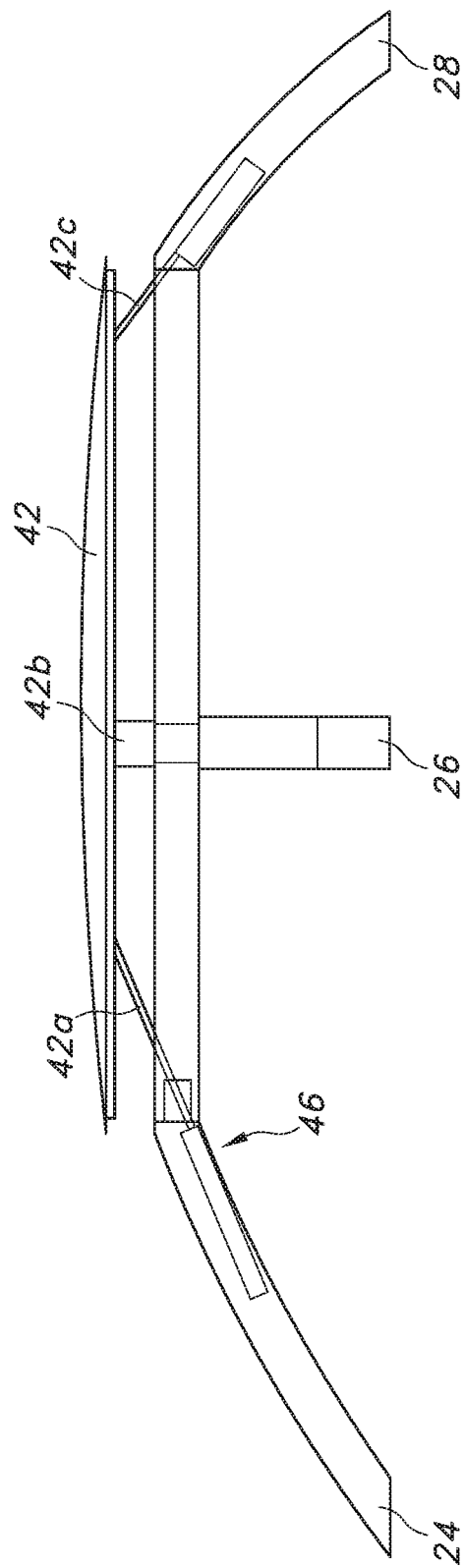
FIG. 3 is a side view of the system of FIG. 2.

In the particular embodiment shown, and with reference to FIGS. 2 and 3 together, it can be appreciated that the roof rail 42 also includes a second or intermediate support 42b engaging B-pillar 26, as well as a third or rear support 42c engaging the C-pillar 28. The arrangement may be such that the supports 42b, 42c are slidably received in recesses within the corresponding pillars 26, 28. Consequently, the supports 42a, 42c are free to move to and fro in a passive manner response to the actuation and lifting/lowering of the rail 42 by the actuator 46.

Figure 5A:
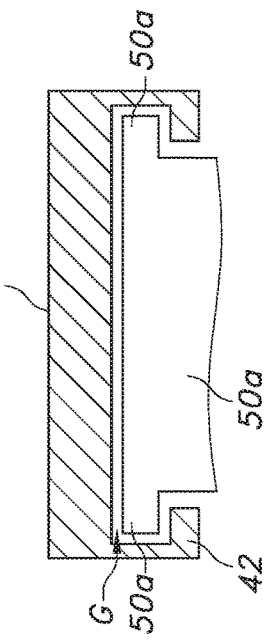
FIG. 5A is a cross-sectional view along line 5A-5A of FIG. 5.
Figure 5:
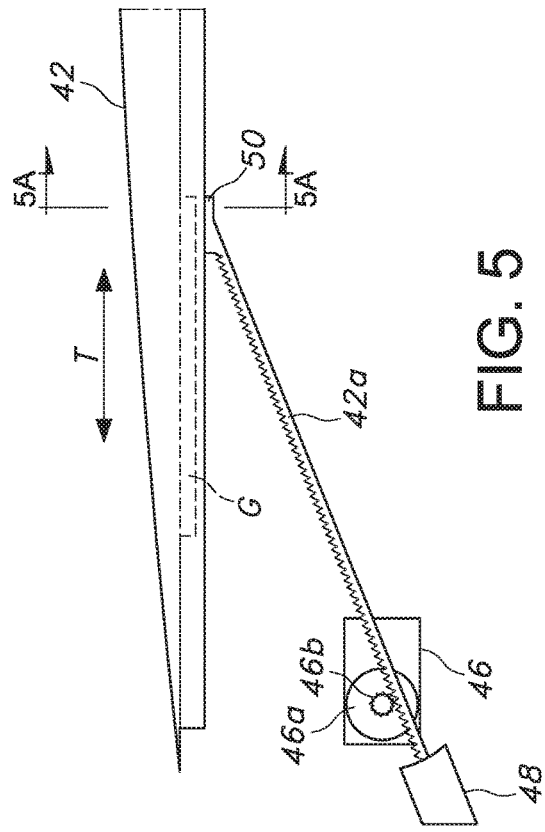
FIG. 5 is a partially cutaway side view illustrating the actuator and the sliding connection of the rail.
Figure 4:
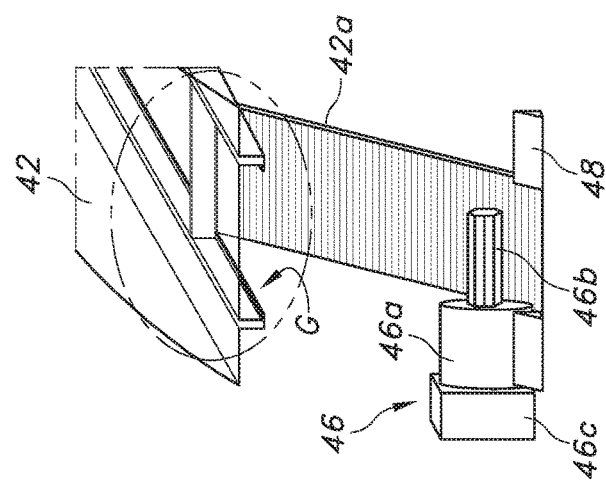
FIG. 4 is a partially cutaway perspective view of an actuator for the system.

Turning to FIGS. 4 and 5, a particular embodiment of an actuator 46 is shown in the form of a rack and pinion arrangement. Specifically, the support 42a is provided with teeth (thus forming a rack) for engaging a gear or pinion 46b rotated by a motor 46a forming part of actuator, which may be connected to a stable support 46c. The support 42a may thus be considered to form a part of the actuator 46. A guide 48 may also be provided within the pillar, such as A-pillar 26, for guiding the support 42a in a sliding fashion. Consequently, rotation of the motor 46a in opposite directions causes the support 42a to slide to and fro in a travel direction T relative to the guide 48 for raising and lowering the associated rail 42. The use of a rack and pinion arrangement also ensures that the rail 42 remains reliably secured in the deployed position despite the weight of cargo on the rail, since the motor 46a when stopped would prevent the pinion 46b from rotating, and thus serves as a holder to maintain the security of the system 10.

As also shown in FIG. 5, the first or front support 42a may optionally be connected to the rail 42 for relative sliding movement. Specifically, perhaps best understood with reference to the cross-sectional view of FIG. 5A, the support 42a may include a connector 50 for slidably connecting to the rail 42. In the particular embodiment, the connector 50 includes outwardly projecting pins 50a that interface with a groove G formed in the interior of the rail 42. Consequently, as the forward support 42a is raised and lowered, the connector 50 slides along the rail 42, thus allowing for selective control of the raised height (and the time it takes to reach the maximum height) as a function of the actuation.

Figure 6:
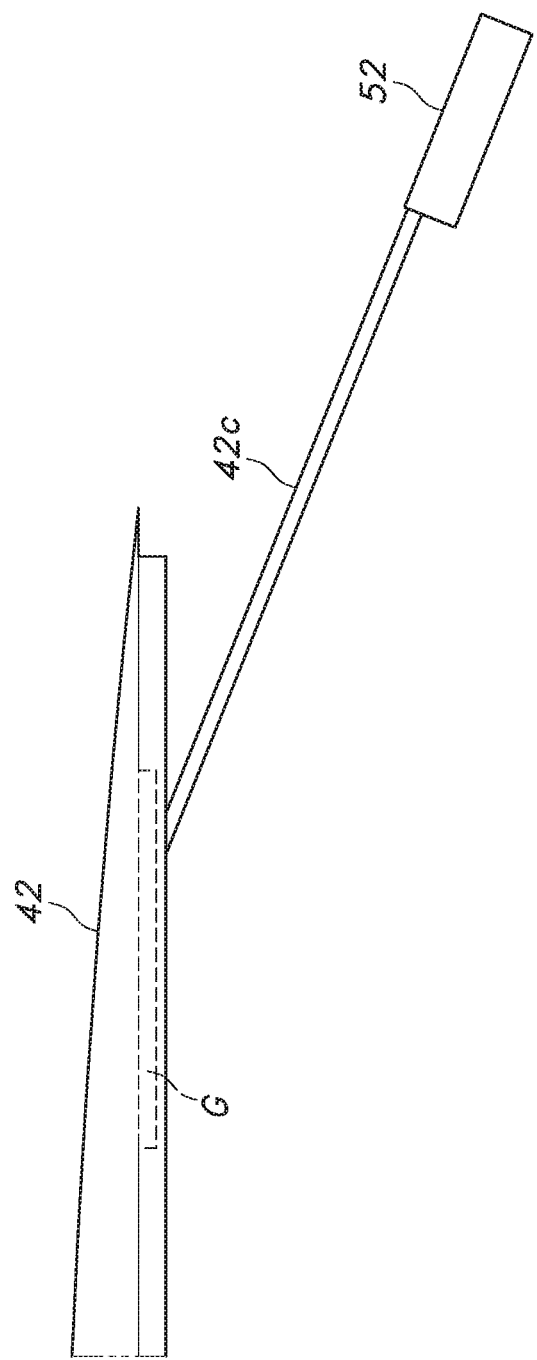
FIG. 6 is a partially cutaway side view further illustrating the sliding connection of the rail.

As indicated in FIG. 6, a similar arrangement may also be provided at the rear support 42c associated with the C-pillar 28. The C-pillar 28 may also include a guide 52 for receiving, supporting, and guiding the depending support 42c during the activation and de-activation of the rail 42, such as in a sliding fashion. A guide 54 may also be provided for the support 42b associated with the B-pillar 28, but the sliding feature is not necessary since the movement is essentially in the vertical direction V.

FIGS. 7 and 7A also illustrate the option of including one or more latches 56 for latching the rail 42 to the vehicle 20 and one or more of the pillars 24, 26, 28 in particular. In one embodiment, the latch 56 comprises a magnetic coupling formed between one or more of the supports 42b, 42c and the corresponding pillar 26, 28 (or the associated guide 52, 54). The coupling may be established between opposed (in orientation and polarity) magnets 56a, 56b that connect when the rail 42 is raised, which should be sufficiently robust to allow for support of any articles or objects stored by the rack. Either the automatic lowering or manual force may then be used to disconnect the rail 42 and return it to the non-deployed position.

The actuator 46 is shown in the A-pillar 24, which advantageously is proximate to the vehicle battery at the typical location in an engine compartment of the vehicle 20, but it could be associated with the B-pillar 26 or the C-pillar 28 instead with suitable wiring to the battery (which can sometimes be located at the rear of the vehicle 20, such as in the trunk). The actuator 46 may also take different forms, such as a linear actuator, and/or may be pneumatic instead of mechanical. Multiple actuators may also be provided for each rail 42, 44.

While the foregoing discussion centered on one rail 42, it should be appreciated the same or a similar configuration could be used on the second rail 44, or perhaps even additional rails, as indicated by the depiction of actuator 46 of the left hand side of FIG. 2. The rails 42, 44 may also form part of a cargo rack (not shown) that includes sidewalls and end walls for receiving cargo. The particular form or shape of the rails 42, 44 is not considered important.

The rails 42, 44 may also be recessed relative to the roof panel 22 in the non-deployed position. Specifically, with reference back to FIG. 1, a channel 60 may be provided for receiving a support portion of each rail 42, 44. The channels 60 may connect with the pillars 24, 26, 28, and transverse members 62 may form connections to create a framework for supporting the roof panel 22. A seal 64 may also be provided for sealing the corresponding interface from the ingress of moisture when the rail 42 is stowed within the channel 60. The upper portions or faces of the rails 42, 44 may also be contoured for matching the profile of the roof panel 22, so that in a flush condition, a substantially continuous appearance is provided (see, e.g., FIG. 1).

Actuation of the system 10 to deploy the rail(s) 42, 44 may be achieved using a control (not shown) within the vehicle 20, such as on a control panel. Alternatively or additionally, the control may be achieved by a remote device, such as a portable or handheld mobile computer or a key fob (not shown). In any case, the system 10 may be selectively activated by the user when cargo storage on the vehicle roof is desired, and de-activated when this functionality is not needed.

In summary, an automatic sliding roof rail system 10 is provided that can be selectively deployed by a vehicle operator when it is desirable to store cargo on a vehicle roof. The system 10 includes an actuator 46 for moving a rail 42 (or rail 44) recessed in one (or more) of the pillars 24, 26, 28 for supporting the vehicle roof (panel 22), which creates a low profile arrangement. The rail 42 may also be slidably connected to one or more supports 42a, 42c to allow for regulation of the height as a function of the actuation. Latches 56 may also be provided for holding the rail 42 in the deployed or raised condition, such as along depending portions 42b, 42c of the rail that are not associated with actuator 46. A selectively actuatable system 10 thus results that is reliable and secure in operation.

The foregoing description of an automatic sliding roof rail system has been presented for purposes of illustration. It is not intended to be exhaustive or to limit the embodiments to the precise form disclosed. Obvious modifications and variations are possible in light of the above teachings. For instance, in a vehicle 20 without three pillars, as shown, one of the supports (such as support 42b if no B-pillar 26 is present) may be omitted. The supports or actuator may also extend along an outer surface of the pillar, such as adjacent to the vehicle cabin, with the pillars thus providing support and guidance in the same manner as if the support were recessed within a hollow portion of the pillar. All such modifications and variations are within the scope of the appended claims when interpreted in accordance with the breadth to which they are fairly, legally and equitably entitled.

What is claimed:

1. A system for providing cargo storage on a vehicle roof, comprising:
   a tubular pillar for supporting the vehicle roof;
   a rail adapted for raising and lowering relative to the vehicle roof between a deployed position for receiving cargo and a non-deployed position; and
   an actuator positioned at least partially along the tubular pillar for moving the rail relative to the vehicle roof.

2. The system of claim 1, wherein the actuator comprises a support for the rail, the support being positioned at least partially within the tubular pillar and projecting vertically therefrom in the deployed position of the rail.

3. The system of claim 2, wherein the at least one pillar comprises an A-pillar.

4. The system of claim 1, further including a second rail adapted for being raised and lowered relative to the vehicle roof, and further including a second actuator for moving the second rail relative to the vehicle roof.

5. The system of claim 1, wherein a first support for the rail is slidably connected to the rail.

6. The system of claim 5, wherein the first support is positioned in a C-pillar.

7. The system of claim 6, wherein a second support for the rail is positioned in a B-pillar.

8. The system of claim 1, wherein the actuator comprises a pinion and the rail is connected to a rack in engagement with the pinion, the rack positioned at least partially within the at least one pillar.

9. The system of claim 1, further including a latch for latching the rail in the deployed position.

10. The system of claim 9, wherein the latch comprises a magnetic coupling formed between a support for supporting the rail and another pillar for supporting the vehicle roof.

11. A system for providing cargo storage on a vehicle roof, comprising:
    an A-pillar for supporting the vehicle roof;
    a rail adapted for being raised and lowered relative to the vehicle roof between a deployed position for receiving cargo and a non-deployed position; and
    a support for the rail received within the A-pillar.

12. The system of claim 11, further including an actuator for moving the rail relative to the vehicle roof.

13. The system of claim 12, wherein the actuator is positioned at least partially within the A-pillar.

14. The system of claim 11, further including a plurality of pillars, and wherein a support for the rail is associated with each of the plurality of pillars.

15. The system of claim 11, wherein the support is slidably connected to the rail for moving to and fro as the rail moves between the deployed and non-deployed positions.

16. A system for providing storage for cargo, comprising:
    a vehicle including a roof;
    a rail adapted to being raised and lowered relative to the roof between a deployed position for receiving cargo and a non-deployed position; and
    a first support for supporting the rail, the first support connected to the rail for sliding along the rail when the rail is raised and lowered.

17. The system of claim 16, further including an actuator connected to the first support for moving the rail.

18. The system of claim 16, further including a second support for supporting the rail, the second support slidably connected for moving along the rail in moving between the deployed and non-deployed positions.

19. The system of claim 18, further including a third support for supporting the rail, the third support being fixed to the rail between the first and second supports and positioned at least partially within a B-pillar of the vehicle.

20. The system of claim 16, wherein the roof is supported by at least one pillar, the first support at least partially received within the pillar and extending therefrom in the deployed position of the rail.

\* \* \* \* \*